United States Patent
Frese (10) Patent No.: US 10,935,479 B2
(45) Date of Patent: Mar. 2, 2021

(54) METHOD FOR DETERMINING THE AVERAGE RADIUS OF GYRATION OF PARTICLES WITH A SIZE OF LESS THAN OR EQUAL TO 1 MICRON IN A SUSPENSION, AND DEVICE FOR CARRYING OUT THE METHOD

(71) Applicant: FRAUNHOFER-GESELLSCHAFT ZUR FÖRDERUNG DER ANGEWANDTEN FORSCHUNG E.V., Munich (DE)

(72) Inventor: Ines Frese, Mainz (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 224 days.

(21) Appl. No.: 15/759,280

(22) PCT Filed: Sep. 16, 2016

(86) PCT No.: PCT/EP2016/071985
§ 371 (c)(1),
(2) Date: Mar. 12, 2018

(87) PCT Pub. No.: WO2017/046337
PCT Pub. Date: Mar. 23, 2017

(65) Prior Publication Data
US 2018/0180523 A1    Jun. 28, 2018

(30) Foreign Application Priority Data
Sep. 16, 2015    (DE) .................. 10 2015 217 700

(51) Int. Cl.
*G01N 15/02*    (2006.01)
*G01N 15/00*    (2006.01)
(Continued)

(52) U.S. Cl.
CPC . *G01N 15/0205* (2013.01); *G01N 2015/0038* (2013.01); *G01N 2015/035* (2013.01);
(Continued)

(58) Field of Classification Search
CPC .................................................. G01N 15/0205
See application file for complete search history.

(56) References Cited

U.S. PATENT DOCUMENTS

| 4,541,719 A | 9/1985 | Wyatt |
| 6,674,529 B2 | 1/2004 | Sachweh et al. |

(Continued)

FOREIGN PATENT DOCUMENTS

| CN | 108369170 | 10/2019 |
| EP | 0 102 726 A1 | 3/1984 |

(Continued)

OTHER PUBLICATIONS

Aureli et al., "Quantitative characterization of silica nanoparticles by asymmetric flow field flow fractionation coupled with online mulitangle light scattering and ICP-MS/MS detection," J. Anal. At. Spectrom. 2015, 30, 1266; Retrieved [Apr. 16, 2020]; <https://doi.org/10.1039/C4JA00478G> (Year: 2015).*

(Continued)

*Primary Examiner* — Yara B Green
(74) *Attorney, Agent, or Firm* — Leydig, Voit & Mayer, Ltd.

(57) ABSTRACT

The invention relates to a method for determining the average radius of gyration ($r_g$) of particles with a size of ≤1 μm in a suspension, and to a device for carrying out the method according to the invention. The method is based on the scattering of linearly polarised electromagnetic radiation on nanoparticles, which, suspended in a solution, are moved through a through-flow cell. The irradiation is carried out perpendicular to the movement direction, wherein the scat- (Continued)

tering intensity is measured via at least four detectors that are arranged in a defined plane at defined angles. Alternatively, at least one mirror can be used in the position of at least one of the detectors, which deflects the radiation to at least one detector. Based on the scattering intensities, both the average radius of gyration ($r_g$) of the particles as well as the concentration thereof in the suspension can be determined.

20 Claims, 2 Drawing Sheets

(51) Int. Cl.
    *G01N 15/06*     (2006.01)
    *G01N 15/10*     (2006.01)

(52) U.S. Cl.
    CPC ............... *G01N 2015/0693* (2013.01); *G01N 2015/1087* (2013.01)

(56) References Cited

U.S. PATENT DOCUMENTS

| | | | |
|---|---|---|---|
| 7,894,071 B2 | 2/2011 | Frese et al. | |
| 2002/0018204 A1 | 2/2002 | Sachweh et al. | |
| 2002/0070343 A1* | 6/2002 | Hoffman | G01T 1/2018 250/367 |
| 2007/0222985 A1* | 9/2007 | Palumbo | G01N 15/0227 356/338 |
| 2009/0161108 A1 | 6/2009 | Frese et al. | |
| 2009/0185160 A1* | 7/2009 | Mantele | G01N 15/0205 356/39 |
| 2010/0165134 A1* | 7/2010 | Dowski, Jr. | B24B 13/06 348/218.1 |
| 2017/0151339 A1* | 6/2017 | White | A61K 49/0032 |

FOREIGN PATENT DOCUMENTS

| | | |
|---|---|---|
| EP | 1 008 843 A1 | 6/2000 |
| EP | 1 176 414 A2 | 1/2002 |
| GB | 2 376 070 A | 12/2002 |
| WO | WO 2007/074038 A1 | 7/2007 |
| WO | WO 2012/018869 A1 | 2/2012 |

OTHER PUBLICATIONS

Aureli et al. publish date information (Year: 2015).*
The Ultimate Guide to Buying a Light Scattering Instruments for Absolute Macromolecular Characterization, Wyatt Technology Corporation, published 2010; retrieved from internet [Aug. 4, 2020]; retrieved from url <https://cdn.sanity.io/files/0vv8moc6/chroma/99bf49158dd223a283eeec35c61fbbe03f409706.pdf>. (Year: 2010).*
State Intellectual Property Office of the People's Republic of China, Notice on the First Office Action in Chinese Patent Application No. 2016800667811 (dated Jan. 23, 2019).
State Intellectual Property Office of the People's Republic of China, Notice on Grant of Patent Right for Invention in Chinese Patent Application No. 201680066781.1 (dated Aug. 23, 2019).
Teng et al., "Optical Sizing of Aggregated Combustion Particles: Computational Development of a Two-Angle Laser Scattering Technique," *Applied Optics* 45(18): 4396-4403 (2006).
Thierking et al., "On-Line Coupling of Flow Field-Flow Fractionation and Multiangle Laser Light Scattering for the Characterization of Polystyrene Particles," *Analytical Chemistry* 67(18): 3229-3233 (1995).
German Patent Office, Office Action in German Patent Application No. 10 2015 217 700.9 (dated Sep. 1, 2016).
European Patent Office, International Search Report in International Application No. PCT/EP2016/071985 (dated Dec. 8, 2016).
European Patent Office, Written Opinion in International Application No. PCT/EP2016/071985 (dated Dec. 8, 2016).
International Bureau of WIPO, International Preliminary Report on Patentability in International Application No. PCT/EP2016/071985 (dated May 1, 2018).

* cited by examiner

Figure 1

Figure 2

METHOD FOR DETERMINING THE AVERAGE RADIUS OF GYRATION OF PARTICLES WITH A SIZE OF LESS THAN OR EQUAL TO 1 MICRON IN A SUSPENSION, AND DEVICE FOR CARRYING OUT THE METHOD

CROSS-REFERENCE TO RELATED APPLICATIONS

This patent application is the U.S. national phase of International Application No. PCT/EP2016/071985, filed on Sep. 16, 2016, which claims the benefit of German Patent Application No. 10 2015 217 700.9, filed Sep. 16, 2015, the disclosures of which are incorporated herein by reference in their entireties for all purposes.

According to the invention, a method for determining the average radius of gyration $\langle r_g \rangle$ of particles with a size of $\leq 1$ µm, preferably $\leq 500$ nm, particularly preferably $\leq 200$ nm, in a suspension and a device for implementing the method according to the invention is provided. The method is based on the scattering of linearly polarised electromagnetic radiation on nanoparticles which are moved through a flow cell, suspended in a solution. The irradiation is effected perpendicular to the direction of movement, the scattering intensity being measured via at least four detectors which are disposed in a defined plane at defined angles. Alternatively, at least one mirror can be used at the position of at least one of the detectors, which mirror deflects the radiation onto at least one detector. By means of the scattering intensities, both the average radius of gyration $\langle r_g \rangle$ of the particles and the concentration thereof in the suspension can be determined.

It is suspected that nanoparticles (e.g. size<200 nm) can have health consequences in humans and animals and hence are relevant safety-wise with respect to environmental protection. Consequently, there is an urgent necessity for monitoring production methods of certain products in which contamination with nanoparticles occurs. The contamination can occur during preparation of the product, after production of the product or also only when using the product (e.g. by hydrolysis).

The necessity for characterisation of industrial products has become recognised not only in science and politics, but is implemented at present commercially also due to the current tightening of regulations in this matter. Similarly to the case of particle counting in air, corresponding to the ISO 11 057:2011 standard, an optical measurement for colloids, based on the Tyndall effect, is intended to be developed. In fact, for estimating environmentally relevant expositions in aquatic systems, specific analytics are still lacking at this time. Corresponding commercial appliances for implementing characterisation in a contract laboratory are to date not available.

The content of poorly soluble substances in the form of solid nanoparticles in aquatic systems has frequently been neglected in risk evaluation or not particularly taken into account. In the case of most commercial appliances available at present, measurement can take place only within a small range of the total volume of a sample, in relatively high concentrations, which is generally not suitable for the average particle concentrations, which are to be expected, of a sample, prepared according to OECD-105, made of a for example silica-containing material.

Many of the appliances known in the state of the art are not sensitive enough for measurements on pyrogenic silicic acid colloids with low particle concentrations. During characterisation of these colloids, basically two tasks must be solved, namely determination of the average particle size and determination of the particle concentration.

Some scientific standard methods, such as static (SLS) and dynamic (DLS) light scattering, are available for measurement of the particle size and are validated. However, DLS is too laborious and time-consuming for application in product characterisation in industry. In addition, highly qualified personnel are required for adequate interpretation of the measurement results. Since the early 1950s, the particle size has been determined via SLS by means of the dissymmetry method and subsequently the concentration is calculated from the scattering intensity in a conventional manner.

The challenge of an exact as possible determination with known methods resides in an interaction taking place between the individual particles in the actual colloids. This impairs determination of the particle size according to the dissymmetry method. The interaction can be calculated by an angle-dependent measurement of a plurality of dilutions of the analyte and applying the Zimm approximation to zero concentration and zero angles. In the case of actual samples, this procedure is problematic since the concentrations to be expected are so low that detection thereof, even undiluted, represents a challenge. In addition, the intensity of the scattered light of nanoparticles increases proportionally to the sixth power of the particle size. For this reason, naturally occurring, low contamination by larger particles normally restricts the application of these methods to particles of a size of >100 nm which are present in high concentrations.

The large dimensions of the conventional measuring devices represent a further problem. This is caused by the requirement to separate the detection cell and the detectors from each other spatially. The separation is necessary in order to avoid disruptive reflections on the transparent surfaces reaching the detectors since these reflections are normally much stronger than the scattered light. Such measuring devices are generally also very costly, complex to handle and are not able to be miniaturised and automated to the extent that they are suitable for measurements in situ or in a contract laboratory.

A further disadvantage of the known standard methods and measuring devices resides in the fact that they cannot determine, at the same time or in one appliance, the particle size and concentration of nanoparticles. Only a universal method, which enables determination of the particle size with simultaneous calculation of the concentration and also exclusion of the influence of contamination by larger particles and is thereby sufficiently sensitive to determine low concentrations of nanoparticles cost-efficiently, can cover the requirement of industry for a quantitative characterisation of products with respect to contamination with nanoparticles.

In summary, it can be established that no standardised method is available at present with which particles of a size of <200 nm can be characterised even in low particle concentrations with respect to the average radius of gyration $\langle r_g \rangle$ and concentration thereof. Therefore certified contract laboratories cannot at present test products for particle contamination to the extent required by industry and at competitive prices.

Starting herefrom, it was the object of the present invention to provide a method and a device with which the average radius of gyration $\langle r_g \rangle$ and the concentration of particles with a size of $\leq 1$ µm, preferably $\leq 500$ nm, particularly preferably $\leq 200$ nm, in a suspension, can be determined simply and sensitively.

The object is achieved by the method and the device described herein, and the advantageous developments thereof.

According to the invention, a method for determining the average radius of gyration $\langle r_g \rangle$ of particles with a size of ≤1 µm, preferably ≤500 nm, particularly preferably ≤200 nm, in a suspension, is provided, comprising the steps:

a) movement of a suspension comprising particles of a size of ≤1 µm, preferably ≤500 nm, particularly preferably ≤200 nm, through a flow cell at a specified flow rate along a movement straight line;

b) irradiation of the suspension in the flow cell with linearly polarised electromagnetic radiation of a wavelength of ≤800 nm via a radiation source along an irradiation straight line, the irradiation straight line intersecting the movement straight line at a scattering point; and c) detection of at least two first scattering intensities of the electromagnetic radiation via at least one first and at least one second detector, the at least one first detector being disposed, relative to the irradiation straight line, at a first angle $\theta_1$ and the at least one second detector, relative to the irradiation straight line, at a second angle $180°-\theta_1$;

d) detection of at least two further scattering intensities of the electromagnetic radiation via at least one third and at least one fourth detector, the third detector being disposed, relative to the irradiation straight line, at a third angle $\theta_2$ and the fourth detector, relative to the irradiation straight line, at a fourth angle $180°-\theta_2$ wherein $\theta_2 \neq \theta_1$;

e) repetition of steps a) to d) with a reference liquid without particles instead of the suspension comprising particles;

f) formation of at least four differences of scattering intensities, respectively the scattering intensities of the reference liquid without particles being subtracted from the scattering intensities of the suspension with particles;

g) calculation of the average radius of gyration $\langle r_g \rangle$ of the particles from the at least four differences of scattering intensities, characterised in that the at least one first, second, third and fourth detector is disposed in a plane which is parallel to the irradiation straight line and perpendicular to the movement straight line, at least one mirror for deflecting the electromagnetic radiation to the at least one detector being used alternatively at the position of at least one of the detectors.

The method according to the invention makes it possible, in a rapid and simple manner with high sensitivity and accuracy, to determine the average radius of gyration $\langle r_g \rangle$ of particles with a size of ≤1 µm, preferably ≤500 nm, particularly preferably ≤200 nm, in a suspension. Determination of the average radius of gyration $\langle r_g \rangle$ is also possible for particles which have a size of more than 200 nm (e.g. particles with a size of ≤1 µm), since the angle dependency of the scattering intensity is also characteristic for particles with a size of more than 200 nm in the context of the size, shape and material. The method according to the invention balances out the influence of the chemical interaction in colloidal suspensions and hence allows, in the application of the dissymmetry method for determination of the particle size, this interaction to be neglected.

In the alternative solution of the object according to the invention, a mirror is used at the position of at least one of the detectors (preferably of all detectors), which mirror deflects the electromagnetic radiation onto a detector (e.g. a CCD detector disposed below the at least one mirror). If a planar detector is used, then this can be read out with location or angle resolution. The alternative solution has the effect that the detectors need not necessarily be disposed in the plane which intersects the flow cell. In other words, the detectors can be disposed in a plane below or above the flow cell. This enables the use of planar detectors or planar detector arrays instead of detectors or detector arrays which are disposed in a circle about the flow cell. Possibly, also a disposable chip can be used.

If, in the method, light of a wavelength of 480 nm is used (e.g. blue light), this increases the scattering intensity of the ultrasmall particles and hence increases the sensitivity of the measurement thereof.

The flow cell advantageously has a small volume to be analysed, of for example 10-15 µl, the complete cross-section over the entire beam height of the detection cell being read out at any time. In the case of detection in throughflow mode, this enables automated complete characterisation of fairly large sample volumes of e.g. 20-50 ml within a few hours.

In the method according to the invention, the first angle $\theta_1$ can be from 45° to 55°, preferably 50°, relative to the beam direction, and/or $\theta_1 \pm 4° \leq \theta_2 \leq \theta_1 \pm 20°$ applies.

The number of detection angles between 40° and 90°, relative to the beam direction, can be ≥2.

Preferably, calculation of the average radius of gyration $\langle r_g \rangle$ of the particles comprises the following steps:

a) calculation of a value $Z_1$ from the at least two first scattering intensities according to the formula $$Z_1 = \frac{I_{\theta_1}}{I_{180°-\theta_1}} = \frac{P_{\theta_1}}{P_{180°-\theta_1}} \left[ 1 - \frac{2 A_2 M_P c_P}{(1 + 2 A_2 M_P c_P P(q)_\theta)} (P_{\theta_1} - P_{180°-\theta_1}) \right]$$

wherein $I_{\theta_1}$: scattering intensity with the first angle $\theta_1$;

$I_{180°-\theta_1}$: scattering intensity with the second angle $180°-\theta_1$;

$P(\theta_1)/P(180°-\theta_1)$: quotient of the shape factors which is produced from the shape and size of the particles;

$M_p$: average molecular mass of the NP;

$c_p$: concentration, $A_2$: second virial coefficient; and b) calculation of a value $Z_2$ from the at least two further scattering intensities according to the formula $$Z_2 = \frac{I_{\theta_2}}{I_{180°-\theta_2}} = \frac{P_{\theta_2}}{P_{180°-\theta_2}} \left[ 1 - \frac{2 A_2 M_P c_P}{(1 + 2 A_2 M_P c_P P(q)_\theta)} (P_{\theta_2} - P_{180°-\theta_2}) \right]$$

wherein $I_{\theta_2}$: scattering intensity with the third angle $\theta_2$;

$I_{180°-\theta_2}$: scattering intensity with the fourth angle $180°-\theta_2$;

$P(\theta_2)/P(180°-\theta_2)$: quotient of the shape factors which is produced from the shape and size of the particles;

$M_p$: average molecular mass of the NP;

$c_p$: concentration, $A_2$: second virial coefficient; and c) numerical determination of the average radius of gyration $\langle r_g \rangle$ by means of a calibration curve calculated for the particles according to the following formula:

$$F(\langle r_g \rangle) = 0.5 \cdot [Z_1 - Z_2 + (Z_1/Z_2 - 1)].$$

In a further step of the method, the concentration of the particles in the suspension can be determined, determination of the concentration comprising the following steps:
  a) detection of a scattering intensity, 90° relative to the irradiation direction of the electromagnetic radiation, via a fifth detector and detection of the irradiation intensity $I_0$ via a sixth detector, the fifth detector being disposed, relative to the irradiation straight line, at a fifth angle of 90° and the sixth detector, relative to the irradiation straight line, at a sixth angle of 180°;
  b) calculation of $R(\theta_l)$, $R(\theta_m)$ of any pair from the five scattering intensities $I_l$, $I_m$ at the irradiation intensity $I_0$ wherein $$R(\theta_i) = \frac{I_{\theta_i}}{I_o} \frac{r^2}{V\cos\theta_i} :$$

Rayleigh ratio at the angle $\theta_i$;
V: scattering volume and
$r^2$: square of the spacing between the centre of the scattering volume and the corresponding detector;
  c) combination, in pairs, of the scattering intensities detected at least with the first, second, third, fourth and fifth angle with each other and calculation of at least 10 independent concentrations $c_i$ according to the formula $$c_i = 1/(M_p * K) * [1/P(\theta_l) - 1/P(\theta_m)]/[1/R(\theta_l) - 1/R(\theta_m)]$$

wherein
$M_p$: molecular weight of the particles;
K: contrast factor relative to material and concentration for characterisation of the scattering capacity of the particles;
$P(\theta_l)$, $P(\theta_m)$: shape factors for scattering signals of any pair from the five scattering intensities;
$R(\theta_l)$, $R(\theta_m)$: Rayleigh ratios, dependent upon material and particle size, of any pair from the five scattering intensities; and
  d) calculation of the average of the at least 10 independent concentrations $c_i$ and calculation of the standard deviation.

The combination, in pairs, of the scattering intensities detected at least with the first, second, third, fourth and fifth angle with each other (in step b)) produces, according to combinatorial rules, the following 10 combinations without repetition:
  $1^{st}$ angle-$2^{nd}$ angle;
  $1^{st}$ angle-$3^{rd}$ angle;
  $1^{st}$ angle-$4^{th}$ angle;
  $1^{st}$ angle-$5^{th}$ angle
  $2^{nd}$ angle-$3^{rd}$ angle;
  $2^{nd}$ angle-$4^{th}$ angle;
  $2^{nd}$ angle-$5^{th}$ angle;
  $3^{rd}$ angle-$4^{th}$ angle;
  $3^{rd}$ angle-$5^{th}$ angle; and
  $4^{th}$ angle-$5^{th}$ angle.

The at least one first and at least one second, and also the at least one third and at least one fourth detector, can, in pairs with each other, be disposed symmetrically, relative to the 90° axis.

The detectors can comprise respectively an input surface or input opening which is disposed, at least in regions, on a flow cell surface or abuts or is identical, at least in regions, to the latter, the input surface or input opening being a flat cavity which is transparent for the electromagnetic radiation, optionally an air space, or a window area which is transparent for electromagnetic radiation, and preferably having a refractive index which is essentially similar to the refractive index of the flow cell surface, particularly preferably a refractive index which deviates from the refractive index of the flow cell surface by ≤0.1, preferably ≤0.05.

The flow cell can
  a) have a volume of 1 to 450 µl, preferably 2 to 300 µl, particularly preferably 5 to 240 µl, in particular 10 to 180 µl;
  b) have in cross-section, i.e. perpendicular to the flow direction of the suspension, a circular, rectangular or polygonal configuration and the flow cell can be configured preferably along the direction of movement in the form of a straight circular cylinder;
  c) comprise glass and/or a polymer or consist thereof; and/or
  d) have, on a contact surface with the suspension, a refractive index which corresponds essentially to the refractive index of the suspension, preferably a refractive index which deviates from the refractive index of the suspension by ≤0.1, preferably ≤0.05.

The suspension can be moved at a flow rate of 0.02 to 2 ml/min, preferably 0.04 to 1 ml/min, particularly preferably 0.1 to 0.5 ml/min, in particular 0.2 to 0.3 ml/min, through the flow cell, preferably in a laminar flow profile. Small flow rates make it possible to identify, with a time-resolved data photograph, in a longer timespan, larger particles as a time-resolved additional peak, whilst these pass through the scattering point.

Before detection of the scattering intensity, the detectors can be calibrated in the method, the deviation of the actual position of the detectors from the ideal position of the detectors being compensated for preferably by the calibration.

In a preferred embodiment, at least one radiation path from the scattering point to at least one detector is isolated optically relative to a radiation path from the scattering point to at least one adjacent detector, preferably by a screen, which is not transparent for the electromagnetic radiation, along the radiation path, the screen having particularly preferably an anti-reflection surface property, in particular an anti-reflection surface which comprises a black gel or a black sheet enamel or consists thereof. As a result, total reflection on light waveguide walls along the radiation path can be suppressed so that only the desired scattering photons arrive at the corresponding detector.

The method can be characterised in that the following steps are implemented:
  a) movement of the suspension with the particles through the flow cell;
  b) detection of the scattering intensities of the electromagnetic radiation of the suspension in the flow cell;
  c) movement of air or another suitable separation medium through the flow cell for spatial separation of the suspension and the reference solution;
  d) movement of a reference solution which consists of the suspension without particles through the flow cell;
  e) detection of the scattering intensities of the electromagnetic radiation of the reference solution in the flow cell; and
  f) subtraction of the scattering intensity measured for the reference solution from the scattering intensity determined for the suspension;
preferably steps a) to f) being repeated several times.

The detectors can concern Si detectors and/or CCD sensors, preferably Si detectors, avalanche photodiodes and/or avalanche photodiode arrays with or without subsequent impedance amplifier.

In a preferred embodiment, the detected scattering intensity is corrected with an electronic data filter, preferably a histogram filter, which corrects the scattering intensity particularly preferably with reference to signals of particles of a size of >100 nm, in particular by subtraction of these signals. The electronic data prefiltration makes it possible to calculate the quantity of larger particles in the solution during the evaluation, and consequently to make the small particles "visible" despite the presence of the large ones. Consequently, the sensitivity of the measurement is increased relative to the ultrasmall particles.

The electromagnetic radiation can
a) have a wavelength in the range of 250 nm to 800 nm, preferably 320 nm to 500 nm, particularly preferably 360 nm to 450 nm, in particular 380 nm to 420 nm; and/or
b) be monochromatic;
c) be linearly polarised parallel or perpendicular to the movement straight line; and/or
d) be produced via a laser light source, preferably a laser diode.

The average size of the particles can be determined on the basis of the Tyndall effect.

In a step before step a) of the method according to the invention, i.e. before movement of the particles through the flow cell, a suspension comprising a liquid and particles of a size of ≤1 μm, preferably ≤500 nm, particularly preferably ≤200 nm, optionally ≤100 nm, and particles of a size of >1 μm, preferably >500 nm, particularly preferably >200 nm, optionally >100 nm, can be filtered through a membrane, the particles of a size of >1 μm, preferably >500 nm, particularly preferably >200 nm, optionally >100 nm, being separated from the suspension.

The radiation source can
i) be disposed along the irradiation straight line; or
ii) the irradiation source can be disposed at an angle relative to the irradiation straight line and the electromagnetic radiation can be deflected via at least one mirror onto the irradiation straight line.

The advantage in the arrangement of at least one mirror at the position of the radiation source is that the radiation source need not be disposed in the plane which intersects the flow cell (more precisely: the scattering point.) As a consequence hereof, the arrangement of the radiation source is flexible, i.e. the radiation source can be disposed, for example below or above the flow cell.

Furthermore, a device for determining the average radius of gyration $\langle r_g \rangle$ of particles with a size of ≤1 μm, preferably ≤500 nm, particularly preferably ≤200 nm, in a suspension is provided, comprising
a) a flow cell, optionally with a pump device for moving a suspension comprising particles of a size of ≤1 μm, preferably ≤500 nm, particularly preferably ≤200 nm, and/or a reference liquid without particles at a specific flow rate along a movement straight line;
b) a radiation source for irradiation of the suspension in the flow cell with linearly polarised electromagnetic radiation of a wavelength of ≤800 nm along an irradiation straight line, the irradiation straight line intersecting the movement straight line at a scattering point; and
c) at least one first and second detector for detection of at least two first scattering intensities of the electromagnetic radiation, the at least one first detector being disposed, relative to the irradiation straight line, at a first angle $\theta_1$ and the at least one second detector, relative to the irradiation straight line, at a second angle $180°-\theta_1$;
d) at least one third and fourth detector for detection of at least two further scattering intensities of the electromagnetic radiation, the at least one third detector being disposed, relative to the irradiation straight line, at a third angle $\theta_2$ and the at least one fourth detector, relative to the irradiation straight line, at a fourth angle $180°-\theta_2$; and
e) a computing unit which is configured for the purpose of subtracting at least the scattering intensities of a reference solution without particles, detected at the first, second, third and fourth detector, from the scattering intensities, detected there respectively, of a suspension comprising particles, and calculating the average radius of gyration $\langle r_g \rangle$ of the particles from the at least four differences, characterised in that the at least one first, second, third and fourth detector are disposed in a plane which is parallel to the irradiation straight line and perpendicular to the movement straight line, at least one mirror for deflecting the electromagnetic radiation to the at least one detector being disposed alternatively at the position of at least one of the detectors.

In the alternative solution of the object according to the invention, the device at the position of at least one of the detectors (preferably of all detectors) comprises a mirror. At least one detector (preferably all the detectors, optionally in the form of a CCD array) can thereby be disposed below or above the at least one mirror.

The device can be characterised in that the first angle $\theta_1$ is from 45° to 55°, preferably 50°, relative to the beam direction, and/or $\theta_1 \pm 4° \leq \theta_2 \leq \theta_1 \pm 20°$ applies.

The number of detection angles between 40° and 90°, relative to the beam direction, can be ≥2.

The computing unit can be set (e.g. be programmed) to determine the average radius of gyration $\langle r_g \rangle$ of the particles via the following steps:
a) calculation of a value $Z_1$ from the two first scattering intensities according to the formula $$Z_1 = \frac{I_{\theta_1}}{I_{180°-\theta_1}} = \frac{P_{\theta_1}}{P_{180°-\theta_1}} \left[ 1 - \frac{2A_2 M_p c_P}{(1 + 2A_2 M_p c_P P(q)_\theta)} (P_{\theta_1} - P_{180°-\theta_1}) \right]$$

wherein
$I_{\theta_1}$: scattering intensity with the first angle $\theta_1$;
$I_{180°-\theta_1}$: scattering intensity with the second angle $180°-\theta_1$;
$P(\theta_1)/P(180°-\theta_1)$: quotient of the shape factors which is produced from the shape and size of the particles;
$M_p$: average molecular mass of the NP;
$c_p$: concentration,
$A_2$: second virial coefficient; and
b) calculation of a value $Z_2$ from the two further scattering intensities according to the formula $$Z_2 = \frac{I_{\theta_2}}{I_{180°-\theta_2}} = \frac{P_{\theta_2}}{P_{180°-\theta_2}} \left[ 1 - \frac{2A_2 M_p c_P}{(1 + 2A_2 M_p c_P P(q)_\theta)} (P_{\theta_2} - P_{180°-\theta_2}) \right]$$

wherein $I_{\theta 2}$: scattering intensity with the third angle $\theta_2$;
$I_{180°-\theta 2}$: scattering intensity with the fourth angle $180°-\theta_2$;
$P(\theta_2)/P(180°-\theta_2)$: quotient of the shape factors which is produced from the shape and size of the particles;
$M_p$: average molecular mass of the NP;
$c_p$: concentration,
$A_2$: second virial coefficient; and c) numerical determination of the average radius of gyration $\langle r_g \rangle$ by means of a calibration curve calculated for a concrete type of particles according to the following formula:

$$F(\langle r_g \rangle) = 0.5 \cdot [Z_1 - Z_2 + (Z_1/Z_2 - 1)].$$

Furthermore, the computing unit can be set to determine the concentration of the particles in the suspension, determination of the concentration comprising the following steps:

a) detection of two further scattering intensities of the electromagnetic radiation, via a fifth detector and sixth detector, the fifth detector being disposed, relative to the irradiation straight line, at a fifth angle of 90° and the sixth detector, relative to the irradiation straight line, at a sixth angle of 180°;

b) calculation of $R(\theta_l)$, $R(\theta_m)$: Rayleigh ratios, dependent upon material and particle size, of any pair from the five scattering intensities $I_l$, $I_m$ at the irradiation intensity $I_0$
wherein $$R(\theta_i) = \frac{I_{\theta_i}}{I_o} \frac{r^2}{V \cos \theta_i}:$$

Rayleigh ratio at the angle $\theta_i$;
V: scattering volume and
$r^2$: square of the spacing between the centre of the scattering volume and the corresponding detector;

c) combination, in pairs, of the scattering intensities detected at least with the first, second, third, fourth and fifth angle with each other and calculation of at least 10 independent concentrations $c_i$ according to the formula $$c_i = 1/(M_p * K) * [1/P(\theta_l) - 1/P(\theta_m)]/[1/R(\theta_l) - 1/R(\theta_m)]$$

wherein $M_p$: molecular weight of the particles;
K: contrast factor relative to material and concentration for characterisation of the scattering capacity of the particles;
$P(\theta_l)$, $P(\theta_m)$: shape factors for scattering signals of any pair from the five scattering intensities;
$R(\theta_l)$, $R(\theta_m)$: Rayleigh ratios, dependent upon material and particle size, of any pair from the five scattering intensities; and d) calculation of the average of the at least 10 independent concentrations $c_i$ and calculation of the standard deviation.

In a preferred embodiment, the pair of at least one first and at least one second detector, and/or the pair of at least one third and at least one fourth detector, is disposed symmetrically, relative to the 90° axis.

The detectors can comprise respectively an input surface or input opening which is disposed, at least in regions, on a flow cell surface or abuts or is identical, at least in regions, to the latter, the input surface or input opening being a flat cavity which is transparent for the electromagnetic radiation, optionally an air space, or a window area which is transparent for electromagnetic radiation, and preferably having a refractive index which is essentially similar to the refractive index of the flow cell surface, particularly preferably a refractive index which deviates from the refractive index of the flow cell surface by ≤0.1, preferably ≤0.05.

The flow cell can a) have a volume of 1 to 450 µl, preferably 2 to 300 µl, particularly preferably 5 to 240 µl, in particular 10 to 180 µl;

b) have in cross-section, i.e. perpendicular to the flow direction of the suspension, a circular, rectangular or polygonal configuration, the flow cell being configured preferably along the direction of movement in the form of a straight circular cylinder;

c) comprise glass and/or a polymer or consist thereof; and/or d) have, on a contact surface with the suspension, a refractive index which corresponds essentially to the refractive index of the suspension, preferably a refractive index which deviates from the refractive index of the suspension by ≤0.1, preferably ≤0.05.

The flow cell can be configured like the measuring cell described in WO 2007/074038 A1 and can also be a part of the measuring chip described in WO 2007/074038 A1. This has the advantage that the path between the scattering volume and the detector is reduced (reflection reduction) and hence the device for implementing the method can be constructed to be small and space-saving (miniaturisation). In addition, here the scattered electromagnetic radiation, separated in the form of webs in the direction of the different scattering angles, can be conducted through an intermediate space which is filled with air or a medium which absorbs light.

Preferably the drive device is suitable for moving the suspension at a flow rate of 0.02 to 2 ml/min, preferably 0.04 to 1 ml/min, particularly preferably 0.1 to 0.5 ml/min, in particular 0.2 to 0.3 ml/min, through the flow cell, preferably in a laminar flow profile. Flow cells with small flow rates make it possible to identify, with a time-resolved data photograph, in a longer timespan, larger particles as a time-resolved additional peak, whilst these cross over the light beam.

The computing unit can be suitable for calibrating the detectors before detection of the scattering intensity, preferably the calibration compensating for the deviation of the actual position of the detectors from the ideal position of the detectors. By means of this suitability of the computing unit, manufacturing tolerances of the device can be corrected, as a result of which the accuracy of the measuring method is increased.

In a preferred embodiment, at least one radiation path from the scattering point to at least one detector is isolated optically relative to a radiation path from the scattering point to at least one adjacent detector, preferably by a screen, which is not transparent for the electromagnetic radiation, along the radiation path, the screen having particularly preferably an anti-reflection surface, in particular an anti-reflection surface which comprises a black gel or a black sheet enamel or consists thereof. As a result, total reflection on light waveguide walls along the radiation path can be suppressed so that only scattering photons arrive at the corresponding detector, which move straight ahead at the desired scattering angle.

The device can be suitable for implementing the following steps:

a) movement of the suspension through the flow cell;
b) detection of the scattering intensities of the electromagnetic radiation of the suspension in the flow cell;
c) movement of air or another suitable separation medium through the flow cell for spatial separation of the suspension and the reference solution;
d) movement of a reference solution which consists of the suspension without particles through the flow cell;
e) detection of the scattering intensities of the electromagnetic radiation of the reference solution in the flow cell; and
f) subtraction of the scattering intensity measured for the reference solution from the scattering intensity determined for the suspension;
preferably steps a) to f) being repeated several times.

The detectors can concern Si detectors and/or CCD sensors, preferably Si detectors, avalanche photodiodes and/or avalanche photodiode arrays with or without subsequent impedance amplifier.

The device can be suitable for correcting the detected scattering intensity with an electronic data filter, preferably a histogram filter, which corrects the scattering intensity particularly preferably with reference to signals of particles of a size of >100 nm, in particular by subtraction of these signals.

The radiation source can
a) be suitable for emitting a wavelength in the range of 250 nm to 800 nm, preferably 320 nm to 500 nm, particularly preferably 360 nm to 450 nm, in particular 380 nm to 420 nm; and/or
b) be suitable for emitting monochromatic electromagnetic radiation;
c) be suitable for emitting linearly polarised light parallel or perpendicular to the movement straight line; and/or
d) comprise a laser light source, preferably a laser diode, or consist thereof.

The computing unit can be configured to determine the average size of the particles on the basis of the Tyndall effect.

The device can comprise, furthermore, a membrane for separation of particles of a size of >1 μm, preferably >500 nm, particularly preferably >200 nm, optionally >100 nm, from a suspension comprising a liquid and particles of a size of ≤1 μm, preferably ≤500 nm, particularly preferably ≤200 nm, optionally ≤100 nm, and particles of a size of >1 μm, preferably >500 nm, particularly preferably >200 nm, optionally >100 nm. A prefiltered suspension (e.g. with a pore size of 200 nm or 100 nm) can hereby reach the flow cell, as a result of which the sensitivity of the measurement relative to particles of a small diameter is further improved.

The radiation source can
i) be disposed along the irradiation straight line; or
ii) be disposed at an angle relative to the irradiation straight line and the arrangement can comprise at least one mirror which is disposed so that it deflects the electromagnetic radiation of the radiation source onto the irradiation straight line.

The advantage of the arrangement with a mirror is that the radiation source need not be disposed in the plane which intersects the flow cell. Consequently, the radiation source can be disposed also below or above the flow cell, which makes possible a more compact construction of the device.

The subject according to the invention is intended to be explained in more detail with reference to the subsequent Figures and examples without wishing to restrict said subject to the specific embodiments represented here.

Figure 1:
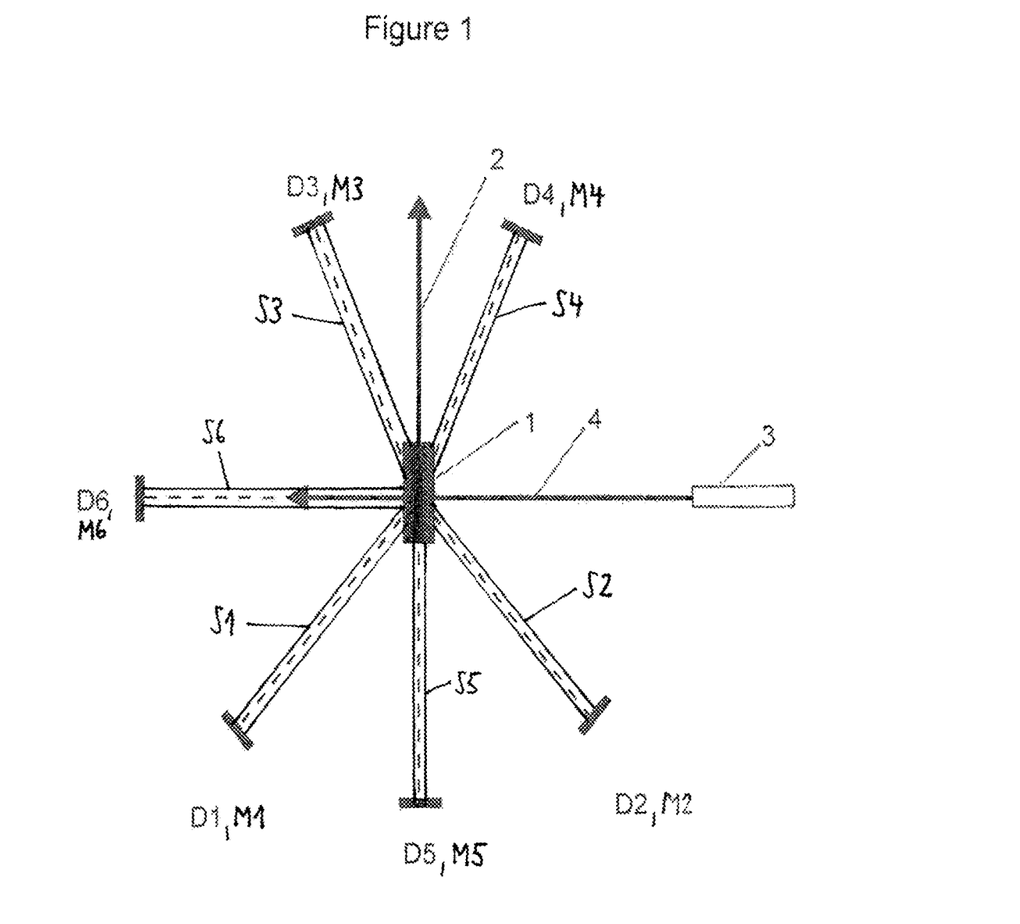

FIG. 1 shows a schematic illustration of the geometric arrangement of a device according to the invention. There emerges from the illustration, the flow cell 1, the radiation source 3 and the individual detectors D1, D2, D3, D4, D5, D6 which are used in the method according to the invention or in the device according to the invention. Via a radiation source 3, linearly polarised electromagnetic radiation is directed along an irradiation straight line 4 onto a flow cell 1. Through the flow cell, a suspension with the particles to be measured is conducted along a movement straight line 2, the movement straight line 2 being perpendicular to the irradiation straight line 4. In a plane about the flow cell 1 which is parallel to the irradiation straight line 4 and perpendicular to the movement straight line 2, a first detector D1, a second detector D2, a third detector D3, a fourth detector D4, a fifth detector D5 and a sixth detector D6 are disposed, which detectors respectively measure the scattering intensities at a first, second, third, fourth, fifth angle and also the irradiation intensity at a sixth angle. From the scattering intensities at the first to fourth angle, the average radius of gyration $\langle r_g \rangle$ is determined according to the invention. For determination of the concentration of the particles in the suspension, in addition, the scattering intensity at the fifth angle (90° relative to the irradiation straight line 4), and also in addition irradiation intensity at the sixth angle (180° relative to the irradiation straight line 4) is taken into account. FIG. 1 also depicts mirrors ML M2, M3, M4, M5, and M6 which can be used to deflect radiation onto detectors DL D2, D3, D4, D5, and D6, respectively. FIG. 1 also depicts screens SL, S2, S3, S4, S5, and S6 which are not transparent for electromagnetic radiation and which optically isolate detectors D1-D6, respectively.

Figure 2:
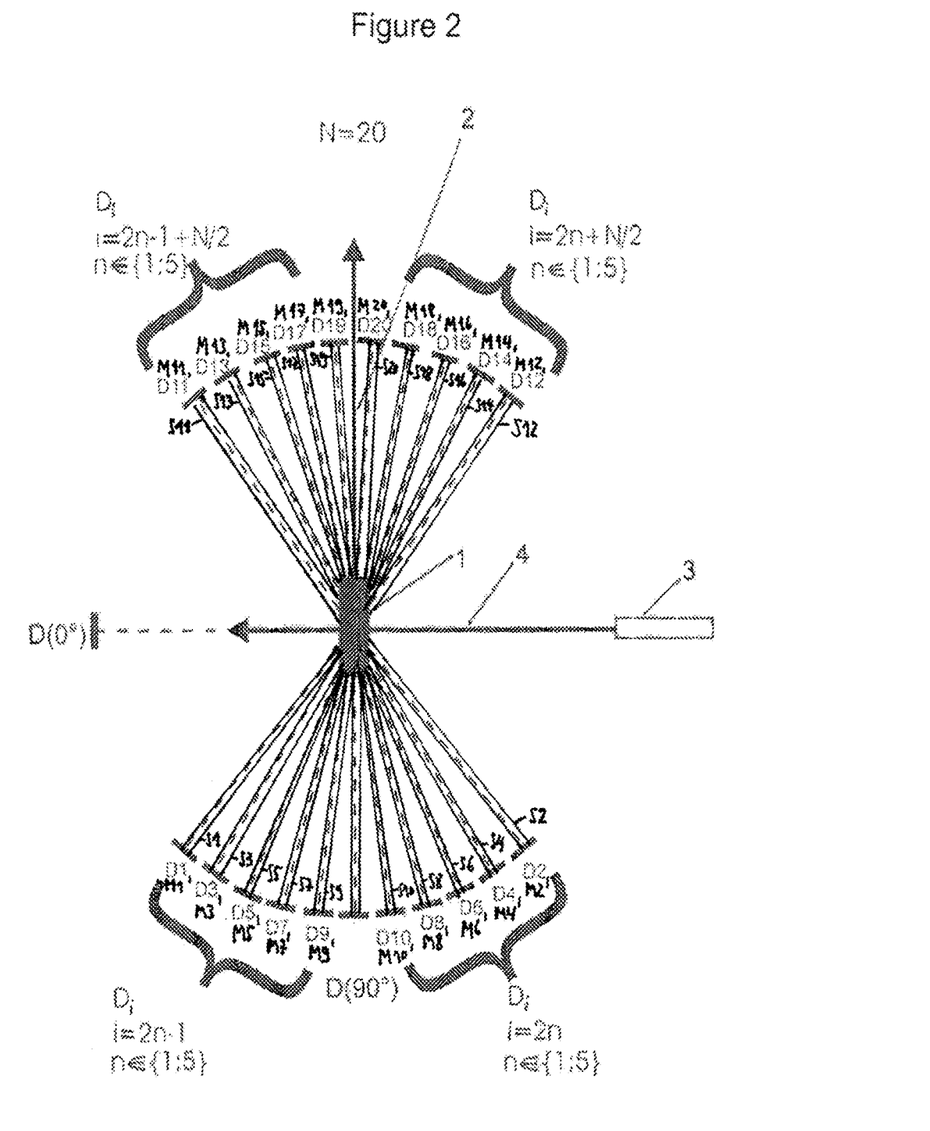

FIG. 2 shows a schematic illustration of the geometric arrangement of a further device according to the invention. The arrangement of the flow cell 1, of the radiation source 3 and of the individual, here 20, detectors D1, D2, D3, D4, D5, D6, D7, D8, D9, D10, D11, D12, D13, D14, D15, D16, D17, D18, D19, D20 is illustrated. The detectors D1 and D2, D3 and D4, D5 and D6, D7 and D8, D9 and D10, D11 and D12, D13 and D14, D15 and D16, D17 and D18, D19 and D20 form respectively pairs of values for a determined angle $\theta_1$ and its associated angle $180°-\theta_1$. Via a radiation source 3, linearly polarised electromagnetic radiation is directed along an irradiation straight line 4 onto a flow cell 1. Through the flow cell, a suspension is conducted here also with the particles to be measured along a movement straight line 2, the movement straight line 2 being perpendicular to the irradiation straight line 4. In a plane about the flow cell 1 which is parallel to the irradiation straight line 4 and perpendicular to the movement straight line 2, the in total 20 detectors D1, D2, D3, D4, D5, D6, D7, D8, D9, D10, D11, D12, D13, D14, D15, D16, D17, D18, D19, D20 are disposed, which detectors measure respectively the scattering intensities at a first to twentieth angle. A twenty-first detector D(0°) measures the irradiation intensity and a twenty-second detector D(90°) measures the 90° scattering intensity. From the scattering intensities at the first to twentieth angle, the average radius of gyration $\langle r_g \rangle$ is determined. For determination of the concentration of the particles in the suspension, in addition the scattering intensity at the twenty-second angle (90° relative to the irradiation straight line 4), and also in addition irradiation intensity at the twenty-first angle (180° relative to the irradiation straight line 4), is taken into account. FIG. 2 also depicts mirrors M1, M2, M3, M4, M5, M6, M7, M8, M9, M10, M11, M12, M13, M14, M15, M16, M17, M18, M19, and M20, which can be used to deflect radiation onto detectors D1, D2, D3, D4, D5, D6, D7, D8, D9, D10, D11, D12, D13, D14, D15, D16, D17, D18, D19, and D20, respectively. FIG. 2 also depicts screens S1, S2, S3, S4, S5, S6, S7, S8, S9, S10, S11, S12, S13, S14, S15, S16, S17, S18, S19, and S20, which are not transparent for electromagnetic radiation and which optically isolate detectors D1-D20, respectively.

EXAMPLE 1

Calculation of the Average Radius of Gyration $\langle r_g \rangle$

The average radius of gyration $\langle r_g \rangle$ is calculated from the averaged and, on larger particles, corrected intensity values corresponding to the dissymmetry method from the data for two corresponding measurement angles set symmetrically relative to the movement straight line.

There applies:

$$Z_i = I_{\theta_i}/I_{180°-\theta_i} = P(\theta_i)/P(180°-\theta_i),$$

wherein $I_{\theta_i}/I_{180°-\theta_i}$: quotient of the intensities measured at the corresponding angles;

$P(\theta_i)/P(180°-\theta_i)$: a quotient of the shape factors, corresponding to the angles $\theta i$ and $180°-\theta_i$, which depends upon the shape of the particles and their size and from which the average radius of gyration can be calculated.

Calculation of the average radius of gyration functions by means of $P(\theta_i)/P(180°-\theta_i)$, if the interaction between the particles and water and also amongst the particles themselves is negligibly small.

Otherwise there applies:

$$I_{\theta_i}/I_{180°-\theta_i} = P(\theta_i)/P(180°-\theta_i) \cdot [1 - f(A_2, c, M_p) \cdot (P(\theta_i)/P(180°-\theta_i))],$$

wherein $f(A_2, c, M_p) > 0$;

$A_2$: second virial coefficient (responsible for the interaction);

c: concentration of the particles;

$M_p$: molecular weight of the particles.

Normally, this is calculated according to the Zimm Method. According to the invention, the interaction is calculated from the angle-dependent measurement of the quotient of $\theta_i$ and $180°-\theta_i$ for two pairs of angles $Z_1$ and $Z_2$. From $Z_1$ and $Z_2$ the difference $(Z_1-Z_2)$, the value $(Z_1/Z_2-1)$ and the average of $Z_1$ and $Z_2$ is determined.

For small particle sizes ($d/\lambda < 0.25$, wherein d: particle diameter and $\lambda$: wavelength) there applies:

$$Z_1 = P(\theta_1)/P(180°-\theta_1) \cdot [1 - f(A_2,c,M_p) \cdot (P(\theta_1)/P(180°-\theta_1))];$$

$$Z_2 = P(\theta_2)/P(180°-\theta_2) \cdot [1 - f(A_2,c,M_p) \cdot (P(\theta_2)/P(180°-\theta_2))];$$

$$\Delta Z = P(\theta_1)/P(180°-\theta_1) - P(\theta_2)/P(180°-\theta_2) - f(A_2,c,M_p) \cdot ([(P(\theta_1)/P(180°-\theta_1)] - (P(\theta_2)/P(180°-\theta_2))]);$$

In the case where $\theta_1$ and $\theta_2$ are relatively close together, there applies:

$$[P(\theta_1)-P(180°-\theta_1)] - [P(\theta_2)-P(180°-\theta_2)] \ll P(\theta_1)-P(180°-\theta_1); \text{ and}$$

$$[P(\theta_1)-P(180°-\theta_1)] - [P(\theta_2)-P(180°-\theta_2)] \ll P(\theta_2)-P(180°-\theta_2); \text{ and hence}$$

$\Delta Z \approx P(\theta_1)/P(180°-\theta_1) - P(\theta_2)/P(180°-\theta_2)$—difference of the quotients in the case of an interaction of the particles amongst each other→0).

There applies then for the quotient:

$$Z_1/Z_2 = P(\theta_1)/P(\theta_2) \cdot P(180°-\theta_2)/P(180°-\theta_1) \cdot [(1-f(A_2,c,M_p) \cdot (P(\theta_1)-P(180°-\theta_1)))]/[(1-f(A_2,c,M_p) \cdot (P(\theta_2)/P(180°-\theta_2)))] - 1;$$

wherein $$(1-f(A_2,c,M_p) \cdot (P(\theta_1)-P(180°-\theta_1))) \approx (1-f(A_2,c,M_p) \cdot (P(\theta_2)/P(180°-\theta_2)); \text{ and}$$

$$Z_1/Z_2 - 1 = P(\theta_1)/P(\theta_2) \cdot P(180°-\theta_2)/P(180°-\theta_1) - 1 < 1,$$

with the ratio of the quotients $Z_1$ and $Z_2$ in the case of an interaction of the particles amongst each other→0).

There applies hence for the ideal case and $d/\lambda < 0.25$:

$$\Delta Z \approx Z_1/Z_2 - 1;$$

Since the influence of $f(A_2, c, M_p)$ is reduced by the formation of $\Delta Z$ and $(Z_1/Z_2-1)$ to a negligibly small value, the particle size can be calculated from the average of both measured Z. This is effected according to the following correlation:

$$[\Delta Z + Z_1/Z_2 - 1]/2$$

EXAMPLE 2

Calculation of the Particle Concentration

The concentration can then be calculated from the angle-dependent measured intensities. In order to compensate for manufacturing and positioning errors, the intensity measured with at least five (optionally also six) scattering angles is used.

There applies:

$$K/R(\theta_1) = 1/(M_p \cdot P(\theta_1) \cdot c) + 2A2_1/P/V;$$

$$K/R(\theta_2) = 1/(M_p \cdot P(\theta_2) \cdot c) + 2A2_2/P/V;$$

wherein

K=const.;

$P=(1+\cos^2 \theta_i)/2r^2$;

r=spacing of detection cell to the detector or mirror;

$R(\theta_i) = [(I_{Analyst} - I_{Ref})/I_0]_{\theta_i}$;

V=scattering volume.

Furthermore, there applies:

$$K/R(\theta_1) - K/R(\theta_2) = 1/(M_p \cdot c) \cdot [1/P(\theta_1) - 1/P(\theta_2)];$$

$$c = 1/(M_p \cdot K) \cdot [1/P(\theta_1) - 1/P(\theta_2)]/[1/R(\theta_1) - 1/R(\theta_2)]; \text{ and}$$

$$2A_2 = (K/R(90°) - (1/(c \cdot M_p \cdot P(90°)));$$

There result then from the five angles, ten values for the concentration which are averaged and subsequently the standard deviation is calculated. The standard deviation provides a measurement of the accuracy of the method, a conclusion being able to be drawn hence with respect to the system-related inaccuracy of the device according to the invention (e.g. a construction-conditioned, slight deviation of the detectors or mirror from the ideal angle) which can be compensated for via a corresponding calibration.

The invention claimed is:

1. A method for determining the average radius of gyration $\langle r_g \rangle$ of particles with a size of $\leq 200$ nm, in a suspension, comprising the steps:

a) moving a suspension comprising particles of a size of ≤200 nm through a flow cell at a specified flow rate along a movement straight line;
b) irradiating the suspension in the flow cell with linearly polarised electromagnetic radiation of a wavelength of ≤800 nm via a radiation source along an irradiation straight line, the irradiation straight line intersecting the movement straight line at a scattering point; and
c) detecting at least two first scattering intensities of the electromagnetic radiation via at least one first and at least one second detector, the at least one first detector being disposed, relative to the irradiation straight line, at a first angle $\theta_1$ and the at least one second detector, relative to the irradiation straight line, at a second angle $180°-\theta_1$;
d) detecting at least two further scattering intensities of the electromagnetic radiation via at least one third detector and at least one fourth detector, the at least one third detector being disposed, relative to the irradiation straight line, at a third angle $\theta_2$ and the at least one fourth detector, relative to the irradiation straight line, at a fourth angle $180°-\theta_2$, wherein $\theta_2 \neq \theta_1$;
e) repeating steps a) to d) with a reference liquid comprising no particles instead of the suspension comprising particles;
f) forming at least four differences of scattering intensities, respectively the scattering intensities of the reference liquid without particles being subtracted from the scattering intensities of the suspension with particles; and
g) calculating the average radius of gyration $\langle r_g \rangle$ of the particles from the at least four differences of scattering intensities,
wherein the at least one first detector, the at least one second detector, the at least one third detector, and the at least one fourth detector are disposed in a plane which is parallel to the irradiation straight line and perpendicular to the movement straight line, at least one mirror for deflecting the electromagnetic radiation to the at least one detector being utilized alternatively at the position of at least one of the detectors;
wherein the average radius of gyration $\langle r_g \rangle$ of the particles is calculated by a method comprising the steps of:
(i) calculating a value $Z_1$ from the at least two first scattering intensities according to the formula $$Z_1 = \frac{I_{\theta_1}}{I_{180°-\theta_1}} = \frac{P_{\theta_1}}{P_{180°-\theta_1}} \left[ 1 - \frac{2A_2 M_p c_P}{(1 + 2A_2 M_p c_P P(q)_\theta)} (P_{\theta_1} - P_{180°-\theta_1}) \right]$$

wherein
$I_{\theta_1}$: scattering intensity with the first angle $\theta_1$;
$I_{180°-\theta_1}$: scattering intensity with the second angle $180°-\theta_1$;
$P(\theta_1)/P(180°-\theta_1)$: quotient of the shape factors which is produced from the shape and size of the particles;
$M_p$: average molecular mass of the particles;
$c_p$: concentration,
$A_2$: second virial coefficient; and
(ii) calculating a value $Z_2$ from the at least two further scattering intensities according to the formula $$Z_2 = \frac{I_{\theta_2}}{I_{180°-\theta_2}} = \frac{P_{\theta_2}}{P_{180°-\theta_2}} \left[ 1 - \frac{2A_2 M_p c_P}{(1 + 2A_2 M_p c_P P(q)_\theta)} (P_{\theta_2} - P_{180°-\theta_2}) \right]$$

wherein
$I_{\theta_2}$: scattering intensity with the third angle $\theta_2$;
$I_{180°-\theta_2}$: scattering intensity with the fourth angle $180°-\theta_2$;
$P(\theta_2)/P(180°-\theta_2)$: quotient of the shape factors which is produced from the shape and size of the particles;
$M_p$: average molecular mass of the particles;
$c_p$: concentration,
$A_2$: second virial coefficient; and
(iii) numerically determining the average radius of gyration $\langle r_g \rangle$ by means of a calibration curve calculated for the particles according to the following formula:

$$F(\langle r_g \rangle) = 0.5 \cdot [Z_1 - Z_2 + (Z_1/Z_2 - 1)].$$

2. The method according to claim 1, wherein the first angle $\theta_1$ is from 45° to 55°, relative to the beam direction, and/or $\theta_1 \pm 4° \leq \theta_2 \leq \theta_1 \pm 20°$ applies.

3. The method according to claim 1, wherein the number of detection angles between 40° and 90°, relative to the beam direction, is ≥2.

4. The method according to claim 1, wherein the pair of the at least one first and at least one second, and/or the pair of the at least one third and at least one fourth detector are disposed symmetrically, relative to the 9° axis.

5. The method according to claim 1, wherein the detectors comprise respectively an input surface or input opening which is disposed, at least in regions, on a flow cell surface or abuts or is identical, at least in regions, to the latter, the input surface or input opening being a flat cavity which is transparent for the electromagnetic radiation, optionally an air space, or a window area which is transparent for electromagnetic radiation.

6. The method according to claim 1, wherein the flow cell
a) has a volume of 1 to 450 μl;
b) has a cross-section perpendicular to the flow direction of the suspension, a circular, rectangular or polygonal configuration;
c) comprises glass and/or a polymer; and/or
d) has, on a contact surface with the suspension, a refractive index which corresponds essentially to the refractive index of the suspension which deviates from the refractive index of the suspension by ≤0.1.

7. The method according to claim 1, wherein the suspension is moved at a flow rate of 0.02 to 2 ml/min through the flow cell.

8. The method according to claim 1, wherein, before detecting the scattering intensity, the detectors are calibrated, the deviation of the actual position of the detectors from the ideal position of the detectors being compensated for.

9. The method according to claim 1, wherein a radiation path from the scattering point to a detector is isolated optically relative to a radiation path from the scattering point to an adjacent detector, by a screen, which is not transparent for the electromagnetic radiation, along the radiation path, the screen having an anti-reflection surface.

10. The method according to claim 1, which comprises:
a) moving the suspension with the particles through the flow cell;
b) detecting the scattering intensities of the electromagnetic radiation of the suspension in the flow cell;
c) moving air or another suitable separation medium through the flow cell for spatial separation of the suspension and the reference solution;
d) moving a reference solution which consists of the suspension without particles through the flow cell;

e) detecting the scattering intensities of the electromagnetic radiation of the reference solution in the flow cell; and f) subtracting the scattering intensity measured for the reference solution from the scattering intensity determined for the suspension.

11. The method according to claim 1, wherein the detectors are Si detectors and/or CCD sensors.

12. The method according to claim 1, wherein the detected scattering intensity is corrected with an electronic data filter which corrects the scattering intensity.

13. The method according to claim 1, wherein the electromagnetic radiation
a) has a wavelength in the range of 250 nm to 800 nm;
b) is monochromatic;
c) is linearly polarised parallel or perpendicular to the movement straight line; or
d) is produced via a laser light source.

14. The method according to claim 1, wherein, prior to step a), a suspension comprising a liquid and particles of a size of ≤200 nm and particles of a size of >200 nm is filtered through a membrane, whereby the particles of a size of >200 nm are separated from the suspension.

15. The method according to claim 1, wherein the radiation source
i) is disposed along the irradiation straight line; or
ii) the irradiation source is disposed at an angle relative to the irradiation straight line and the electromagnetic radiation is deflected via at least one mirror onto the irradiation straight line.

16. A method for determining the average radius of gyration $\langle r_g \rangle$ of particles with a size of ≤200 nm, in a suspension, comprising the steps:
a) moving a suspension comprising particles of a size of ≤200 nm through a flow cell at a specified flow rate along a movement straight line;
b) irradiating the suspension in the flow cell with linearly polarised electromagnetic radiation of a wavelength of ≤800 nm via a radiation source along an irradiation straight line, the irradiation straight line intersecting the movement straight line at a scattering point; and
c) detecting at least two first scattering intensities of the electromagnetic radiation via at least one first and at least one second detector, the at least one first detector being disposed, relative to the irradiation straight line, at a first angle $\theta_1$ and the at least one second detector, relative to the irradiation straight line, at a second angle $180°-\theta_1$;
d) detecting at least two further scattering intensities of the electromagnetic radiation via at least one third detector and at least one fourth detector, the at least one third detector being disposed, relative to the irradiation straight line, at a third angle $\theta_2$ and the at least one fourth detector, relative to the irradiation straight line, at a fourth angle $180°-\theta_2$, wherein $\theta_2 \neq \theta_1$;
e) repeating steps a) to d) with a reference liquid comprising no particles instead of the suspension comprising particles;
f) forming at least four differences of scattering intensities, respectively the scattering intensities of the reference liquid without particles being subtracted from the scattering intensities of the suspension with particles; and
g) calculating the average radius of gyration $\langle r_g \rangle$ of the particles from the at least four differences of scattering intensities, wherein the at least one first detector, the at least one second detector, the at least one third detector, and the at least one fourth detector are disposed in a plane which is parallel to the irradiation straight line and perpendicular to the movement straight line, at least one mirror for deflecting the electromagnetic radiation to the at least one detector being utilized alternatively at the position of at least one of the detectors;

wherein, in a further step, the concentration of the particles in the suspension is determined by a method comprising the steps of:

(i) detecting a scattering intensity, 90° relative to the irradiation direction of the electromagnetic radiation, via a fifth detector and detecting the irradiation intensity $I_0$ via a sixth detector, the fifth detector being disposed, relative to the irradiation straight line, at a fifth angle of 90° and the sixth detector, relative to the irradiation straight line, at a sixth angle of 180°;

(ii) calculating $R(\theta_1)$, $R(\theta_m)$ of any pair from the five scattering intensities $I_l$, $I_m$ at the irradiation intensity $I_0$ wherein $$R(\theta_i) = \frac{I_{\theta_i}}{I_0} \frac{r^2}{V\cos\theta_i}:$$

Rayleigh ratio at angle $\theta_i$;
V: scattering volume; and
$r^2$: square of the spacing between the center of the scattering volume and the corresponding detector;

(iii) combining, in pairs, the scattering intensities detected at least with the first, second, third, fourth and fifth angle with each other and calculating at least 10 independent concentrations $c_i$ according to the formula $$c_i = 1/(M_p*K)*[1/P(\theta_1)-1/P(\theta_m)]/[1/R(\theta_1)-1/R(\theta_m)]$$

wherein
$M_p$: molecular weight of the particles;
K: contrast factor relative to material and concentration for characterisation of the scattering capacity of the particles;
$P(\theta_1), P(\theta_m)$: shape factors for scattering signals of any pair from the five scattering intensities;
$R(\theta_1), R(\theta_m)$: Rayleigh ratios, dependent upon material and particle size, of any pair from the five scattering intensities; and (iv) calculating the average of the at least 10 independent concentrations $c_i$ and calculating the standard deviation.

17. A device for determining the average radius of gyration $\langle r_g \rangle$ of particles with a size of ≤200 nm in a suspension, comprising
a) a flow cell, optionally with a pump device for moving a suspension comprising particles of a size of ≤200 nm at a specific flow rate along a movement straight line;
b) a radiation source for irradiating the suspension in the flow cell with linearly polarised electromagnetic radiation of a wavelength of ≤800 nm along an irradiation straight line, the irradiation straight line intersecting the movement straight line at a scattering point;
c) at least one first and second detector for detecting at least two first scattering intensities of the electromagnetic radiation, the at least one first detector being disposed, relative to the irradiation straight line, at a first angle $\theta_1$ and the at least one second detector, relative to the irradiation straight line, at a second angle $180°-\theta_1$;
d) at least one third and fourth detector for detecting at least two further scattering intensities of the electromagnetic radiation, the at least one third detector being disposed, relative to the irradiation straight line, at a third angle $\theta_2$ and the at least one fourth detector, relative to the irradiation straight line, at a fourth angle $180°-\theta_2$; and
e) a computing unit which is configured to subtract at least the scattering intensities of a reference solution without particles, detected at the first, second, third and fourth detector, from the scattering intensities, detected there respectively, of a suspension comprising particles, and calculating the average radius of gyration $\langle r_g \rangle$ of the particles from the at least four differences, wherein the at least one first detector, the at least one second detector, the at least one third detector and the at least one fourth detector are disposed in a plane which is parallel to the irradiation straight line and perpendicular to the movement straight line, at least one mirror for deflecting the electromagnetic radiation to the at least one detector is disposed alternatively at the position of at least one of the detectors;

wherein the computing unit is set to determine the average radius of gyration $\langle r_g \rangle$ of the particles via the following steps:
(i) calculating a value $Z_1$ from the two first scattering intensities according to the formula $$Z_1 = \frac{I_{\theta_1}}{I_{180°-\theta_1}} = \frac{P_{\theta_1}}{P_{180°-\theta_1}}\left[1 - \frac{2A_2 M_p c_P}{(1+2A_2 M_p c_P P(q)_\theta)}(P_{\theta_1} - P_{180°-\theta_1})\right]$$

wherein
$I_{\theta_1}$: scattering intensity with the first angle $\theta_1$;
$I_{180°-\theta_1}$: scattering intensity with the second angle $180°-\theta_1$;
$P(\theta_1)/P(180°-\theta_1)$: quotient of the shape factors which is produced from the shape and size of the particles;
$M_p$: average molecular mass of the particles;
$c_p$: concentration,
$A_2$: second virial coefficient; and
(ii) calculating a value $Z_2$ from the two further scattering intensities according to the formula $$Z_2 = \frac{I_{\theta_2}}{I_{180°-\theta_2}} = \frac{P_{\theta_2}}{P_{180°-\theta_2}}\left[1 - \frac{2A_2 M_p c_P}{(1+2A_2 M_p c_P P(q)_\theta)}(P_{\theta_2} - P_{180°-\theta_2})\right]$$

wherein
$I_{\theta_2}$: scattering intensity with the third angle $\theta_2$;
$I_{180°-\theta_2}$: scattering intensity with the fourth angle $180°-\theta_2$;
$P(\theta_2)/P(180°-\theta_2)$: quotient of the shape factors which is produced from the shape and size of the particles;
$M_p$: average molecular mass of the particles;
$c_p$: concentration,
$A_2$: second virial coefficient; and
(iii) numerically determining the average radius of gyration $\langle r_g \rangle$ by means of a calibration curve calculated for a concrete type of particles according to the following formula:

$$F(\langle r_g \rangle) = 0.5 \cdot [Z_1 - Z_2 + (Z_1/Z_2 - 1)].$$

18. The device according to claim 17, wherein the first angle $\theta_1$ is from 45° to 55° relative to the beam direction, and/or $\theta_1 \pm 4° \leq \theta_2 \leq \theta_1 \pm 20°$ applies.

19. The device according to claim 17, wherein the number of detection angles between 400 and 90°, relative to the beam direction, is $\geq 2$.

20. A device for determining the average radius of gyration $\langle r_g \rangle$ of particles with a size of $\leq 200$ nm in a suspension, comprising
a) a flow cell, optionally with a pump device for moving a suspension comprising particles of a size of $\leq 200$ nm at a specific flow rate along a movement straight line;
b) a radiation source for irradiating the suspension in the flow cell with linearly polarised electromagnetic radiation of a wavelength of $\leq 800$ nm along an irradiation straight line, the irradiation straight line intersecting the movement straight line at a scattering point;
c) at least one first and second detector for detecting at least two first scattering intensities of the electromagnetic radiation, the at least one first detector being disposed, relative to the irradiation straight line, at a first angle $\theta_1$ and the at least one second detector, relative to the irradiation straight line, at a second angle $180°-\theta_1$;
d) at least one third and fourth detector for detecting at least two further scattering intensities of the electromagnetic radiation, the at least one third detector being disposed, relative to the irradiation straight line, at a third angle $\theta_2$ and the at least one fourth detector, relative to the irradiation straight line, at a fourth angle $180°-\theta_2$; and
e) a computing unit which is configured to subtract at least the scattering intensities of a reference solution without particles, detected at the first, second, third and fourth detector, from the scattering intensities, detected there respectively, of a suspension comprising particles, and calculating the average radius of gyration $\langle r_g \rangle$ of the particles from the at least four differences, wherein the at least one first detector, the at least one second detector, the at least one third detector and the at least one fourth detector are disposed in a plane which is parallel to the irradiation straight line and perpendicular to the movement straight line, at least one mirror for deflecting the electromagnetic radiation to the at least one detector is disposed alternatively at the position of at least one of the detectors;

wherein the computing unit is set to determine the concentration of the particles in the suspension, the determination of the concentration comprising the following steps:
(i) detection of two further scattering intensities of the electromagnetic radiation, via a fifth detector and sixth detector, the fifth detector being disposed, relative to the irradiation straight line, at a fifth angle of 90° and the sixth detector, relative to the irradiation straight line, at a sixth angle of 180°;
(ii) calculation of R($\theta_1$), R($\theta_m$): Rayleigh ratios, dependent upon material and particle size, of any pair from the five scattering intensities $I_l$, $I_m$ at the irradiation intensity $I_O$
wherein $$R(\theta_i) = \frac{I_{\theta_i}}{I_0} \frac{r^2}{V\cos\theta_i}:$$

Rayleigh ratio at the angle $\theta_i$;

V: scattering volume and $r^2$: square of the spacing between the center of the scattering volume and the corresponding detector;

(iii) combination, in pairs, of the scattering intensities detected at least with the first, second, third, fourth and fifth angle with each other and calculation of at least 10 independent concentrations $c_i$ according to the formula $$c_i = 1/(M_p*K)*[1/P(\theta_1)-1/P(\theta_m)]/[1/R(\theta_1)-1/R(\theta_m)]$$

wherein Mp: molecular weight of the particles;

K: contrast factor relative to material and concentration for characterisation of the scattering capacity of the particles;

$P(\theta_1)$, $P(\theta_m)$: shape factors for scattering signals of any pair from the five scattering intensities;

$R(\theta_1)$, $R(\theta_m)$: Rayleigh ratios, dependent upon material and particle size, of any pair from the five scattering intensities; and (iv) calculation of the average of the at least 10 independent concentrations ci and calculation of the standard deviation.

\* \* \* \* \*